United States Patent
Franzino et al.

(10) Patent No.: US 9,375,765 B1
(45) Date of Patent: Jun. 28, 2016

(54) TUBE SCRAPER PROJECTILE

(71) Applicant: Crossford International, LLC, Stamford, CT (US)

(72) Inventors: Joseph J. Franzino, Stamford, CT (US); Venkatagiri Srinivasmurthy, Chicago, IL (US)

(73) Assignee: Crossford International, LLC, Stamford, CT (US)

( * ) Notice: Subject to any disclaimer, the term of this patent is extended or adjusted under 35 U.S.C. 154(b) by 0 days.

(21) Appl. No.: 14/879,198

(22) Filed: Oct. 9, 2015

(51) Int. Cl.
| B08B 9/055 | (2006.01) |
| F16L 55/26 | (2006.01) |
| F16L 55/38 | (2006.01) |
| F16L 55/40 | (2006.01) |
| F16L 101/12 | (2006.01) |

(52) U.S. Cl.
CPC .............. *B08B 9/0557* (2013.01); *B08B 9/055* (2013.01); *F16L 55/26* (2013.01); *F16L 55/38* (2013.01); *F16L 55/40* (2013.01); *F16L 2101/12* (2013.01)

(58) Field of Classification Search
CPC ...... B08B 9/053; B08B 9/055; B08B 9/0553; B08B 9/0557; F16L 2101/12; F16L 55/26; F16L 55/28; F16L 55/38; F16L 55/40; F16L 55/44
USPC .......................... 15/104.05, 104.061, 104.16, 15/104.17–104.19
See application file for complete search history.

(56) References Cited

U.S. PATENT DOCUMENTS

| 849,786 | A | * | 4/1907 | Hildenbrand ........... F41A 29/02 |
| | | | | 15/104.19 |
| 904,122 | A | | 11/1908 | Fletcher |
| 1,424,336 | A | | 8/1922 | Bowman |
| 1,732,277 | A | | 10/1929 | Owens |
| 2,146,644 | A | | 2/1939 | Nelson |
| 2,170,997 | A | | 8/1939 | Griffin |
| 2,599,077 | A | | 6/1952 | Sturgis |
| 2,653,334 | A | | 9/1953 | Bay |
| 2,734,208 | A | | 2/1956 | Griffin |
| 2,958,884 | A | | 11/1960 | Hill et al. |
| 3,939,519 | A | | 2/1976 | Muirhead |
| 4,244,072 | A | | 1/1981 | Dunham et al. |
| 4,281,432 | A | | 8/1981 | Saxon |
| 4,726,089 | A | * | 2/1988 | Knapp .................. B08B 9/0557 |
| | | | | 15/104.061 |
| 4,937,907 | A | | 7/1990 | Antal |
| 5,153,963 | A | | 10/1992 | Saxon et al. |
| 5,305,488 | A | * | 4/1994 | Lyle ...................... B08B 9/0557 |
| | | | | 15/104.061 |

(Continued)

FOREIGN PATENT DOCUMENTS

| EP | 0698423 | 2/1996 |
| GB | 622874 | 5/1949 |

*Primary Examiner* — Mark Spisich

(74) *Attorney, Agent, or Firm* — Carson C. K. Fincham; Fincham Downs LLC.

(57) ABSTRACT

Tube scrapper projectiles for tube cleaning applications such as condenser and chiller tube cleaning utilizing projectile-based mechanical agitation of tubes and pipes. In some cases, the tube cleaning projectiles are configured for selectable indexing of various biasing levels for the blades and in some cases the biasing elements comprise a plurality of arcuate and/or tapered beams oriented axially along the scraper projectile.

21 Claims, 8 Drawing Sheets

(56) References Cited

U.S. PATENT DOCUMENTS

| | | | |
|---|---|---|---|
| 5,335,388 | A | 8/1994 | Salecker |
| 5,560,394 | A | 10/1996 | Jorgensen |
| 5,600,863 | A | 2/1997 | Curran |
| 5,617,604 | A | 4/1997 | Erich |
| 5,784,745 | A | 7/1998 | Saxon et al. |
| 5,797,993 | A | 8/1998 | Woehleke |
| 5,802,667 | A | 9/1998 | Williams |
| 5,809,603 | A | 9/1998 | White |
| 5,819,354 | A | 10/1998 | Alonso et al. |
| 5,940,922 | A | 8/1999 | Saxon et al. |
| 5,960,505 | A | 10/1999 | Sanghoon et al. |
| 5,964,004 | A | 10/1999 | Bean |
| 5,966,768 | A | 10/1999 | Hahn |
| 5,991,955 | A | 11/1999 | Lanasa, Sr. |
| 6,070,285 | A | 6/2000 | Geppert |
| 6,085,376 | A | 7/2000 | Antal et al. |
| 6,152,221 | A | 11/2000 | Carmichael et al. |
| 6,276,017 | B1 | 8/2001 | Lino et al. |
| 6,308,363 | B1 | 10/2001 | Lino et al. |
| 6,368,418 | B1 | 4/2002 | Rowe |
| 6,378,236 | B1 | 4/2002 | Solberg et al. |
| 6,467,121 | B1 | 10/2002 | Franzino et al. |
| 6,792,641 | B1 | 9/2004 | Laker |
| 6,857,158 | B1 | 2/2005 | Hunter et al. |
| 7,121,343 | B2 | 10/2006 | Telfer |
| 7,454,812 | B1 | 11/2008 | Lyle |
| 7,490,381 | B1 | 2/2009 | Franzino |
| 7,526,827 | B1 | 5/2009 | Bitterman |
| 7,685,674 | B2 | 3/2010 | Clements et al. |
| 7,865,995 | B2 | 1/2011 | Mayer |
| 7,971,307 | B2 | 7/2011 | Chow |
| 8,051,523 | B1 | 11/2011 | Franzino |
| 8,256,057 | B2 | 9/2012 | Galantai et al. |
| 8,316,500 | B2 | 11/2012 | Freeman et al. |
| 8,371,057 | B2 | 2/2013 | Coffield, III |
| 8,719,989 | B1 | 5/2014 | Qanaei |
| 8,844,622 | B2 | 9/2014 | Telfer |
| 2007/0119007 | A1 | 5/2007 | Minshall |
| 2007/0161339 | A1 | 7/2007 | Wentworth et al. |
| 2012/0042461 | A1 | 2/2012 | Antal et al. |
| 2013/0213658 | A1 | 8/2013 | Makowiecki et al. |
| 2014/0262277 | A1 | 9/2014 | Meeks |

* cited by examiner ns # TUBE SCRAPER PROJECTILE

BACKGROUND

Air conditioning, industrial chilling and power plant steam condensing systems are typically configured with arrays of tubes. Boilers and other commercial or industrial equipment may also include fluid tubes to provide various heat exchange functionality. Such tubes must be serviced to maintain efficient energy use, prevent or reduce fouling and corrosion and such servicing typically involves utilization of both mechanical and fluid treatment on the interior surfaces of the tubes. The fluid treatment itself often includes application of chemical cleaners or inhibitors. In some cases, different tools may be utilized for each of the mechanical agitation, chemical application, and powered fluid cleaning or washing.

One type of tool that may be utilized to effectuate mechanical agitation of tube deposits is a projectile that includes scraper blades, the projectile being forcibly passed (e.g., fired or shot) through a tube being serviced. Examples of tube scraper projectiles utilized in the tube cleaning industry are described in U.S. Pat. No. 5,305,488 issued to Lyle ("Lyle I") and titled "TUBE CLEANING TOOL", U.S. Pat. No. 7,454,812 issued to Lyle ("Lyle II") and titled "TUBE CLEANING TOOL".

Such projectiles generally include one or more scraper blades for scrapping the inside diameter of a tube or pipe and some mechanism for biasing the scraper blades against the inside walls of the tube or pipe. One typical mechanism for biasing the scraper blades (such as utilized in the Lyle I) includes a rubber bushing nested within or under the blades. Compression of the projectile assembly, e.g., by tightening a retaining nut, forces radial expansion of the rubber bushing, which applies increasing biasing forces on the scraper blades in an outward radial direction. Such typical projectiles, however, may suffer from various deficiencies.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

I. Introduction

Embodiments presented herein are descriptive of tube scraper projectiles (and components and/or features thereof). Tube scrapper projectile assemblies may comprise various components, for example, such as an arcuate, tapered, and/or pliant beam biasing element and/or a may comprise a selectively indexable biasing level (e.g., six (6) distinctly selectable biasing levels), as described in detail herein.

II. Tube Scraper Projectile Assemblies

Figure 1A:
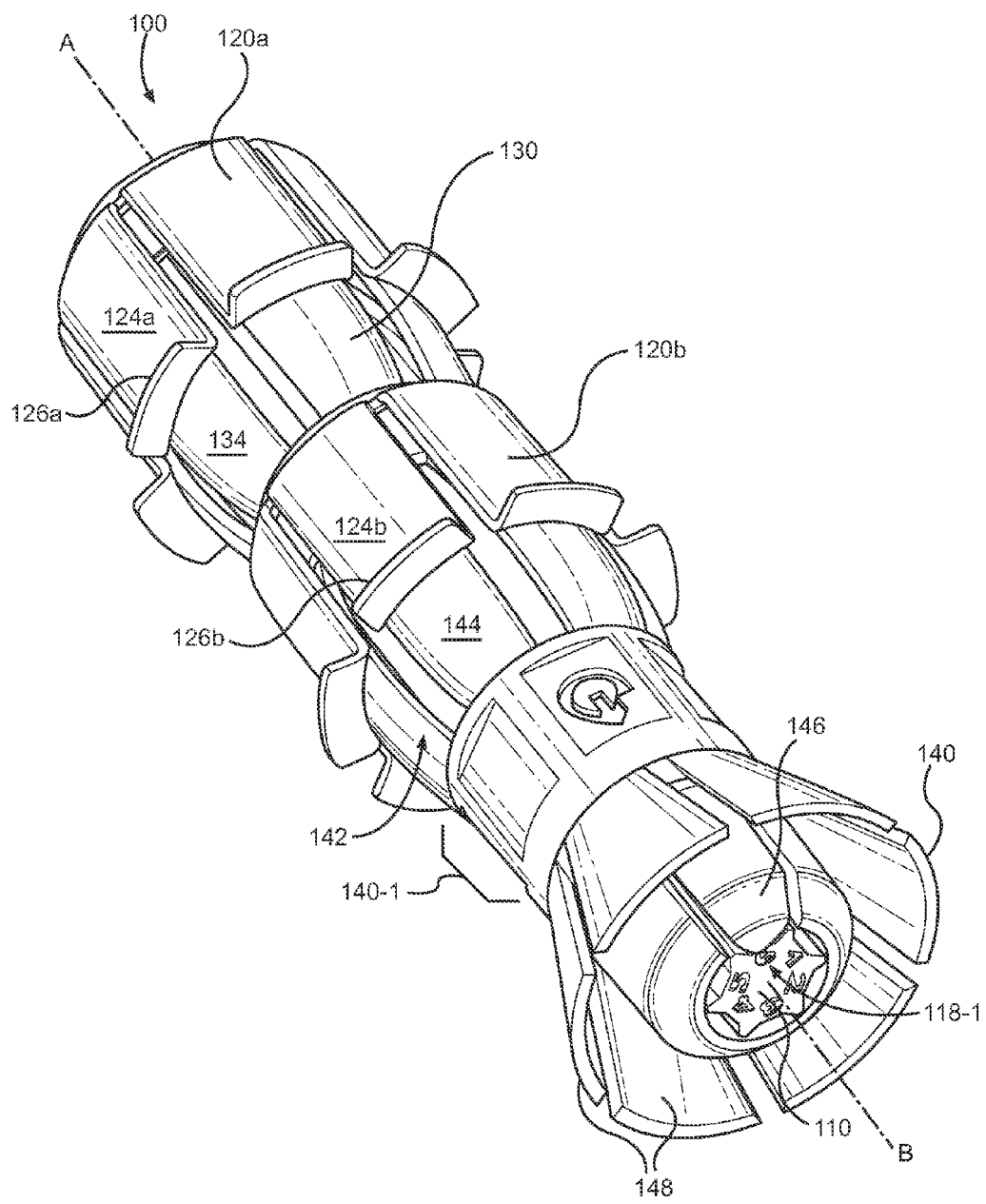
FIG. 1A is an upper, back-left perspective view of a tube scraper projectile assembly according to some embodiments.
Figure 1B:
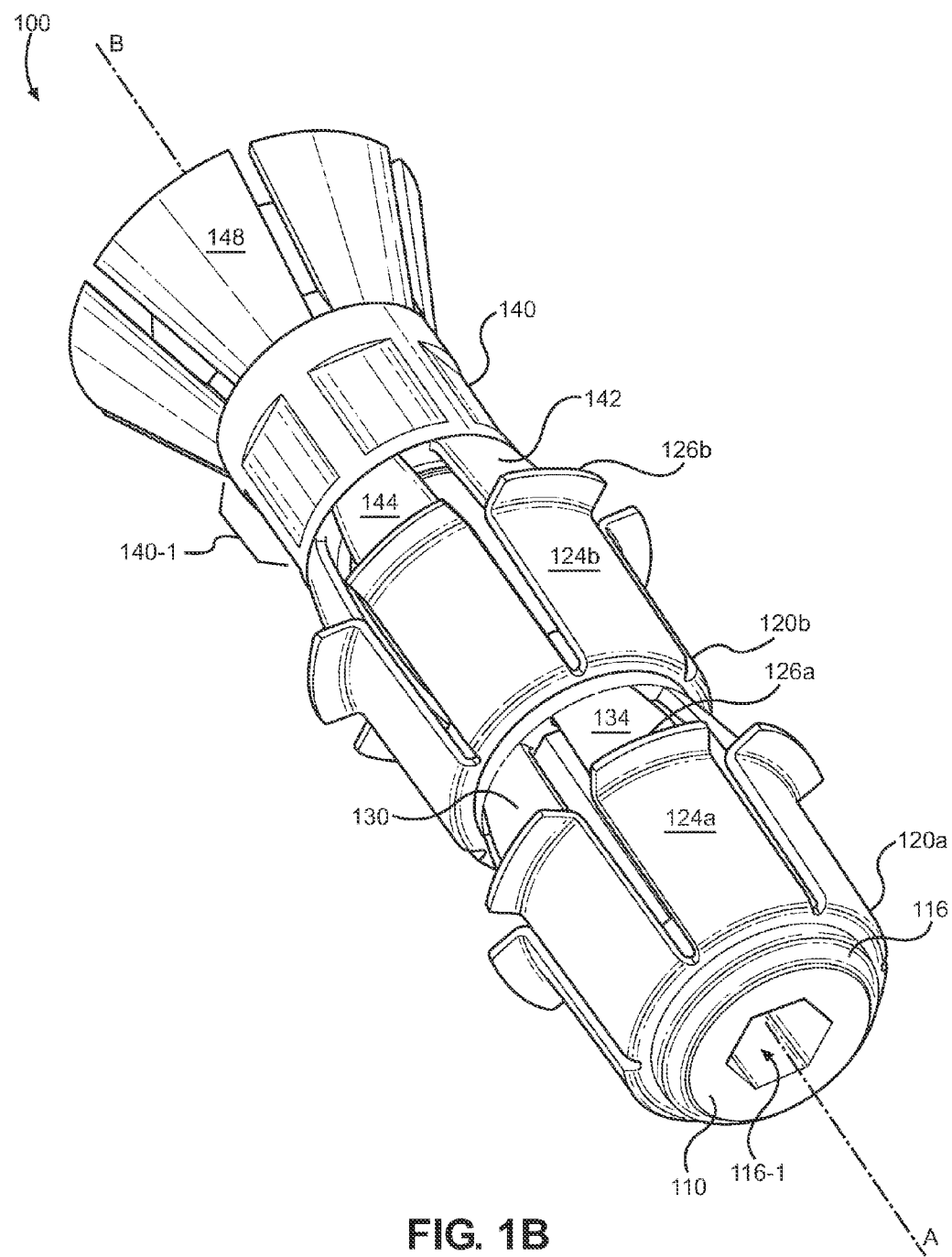
FIG. 1B is an upper, front-right perspective view of the tube scraper projectile assembly of FIG. 1A.

Turning initially to FIG. 1A and FIG. 1B, an upper, back-left perspective view and an upper, front-right perspective view, respectively, of a tube scraper projectile assembly 100 according to some embodiments are shown. In some embodiments, the tube scraper projectile assembly 100 may be disposed along an axis and be identifiable as having a first end "A" and a second end "B", as shown. According to some embodiments, the tube scraper projectile assembly 100 may comprise a shaft 110 (e.g., also disposed and/or oriented along the axis) comprising a stop portion 116, a bore 116-1, and/or an indexing feature 118-1. In some embodiments, the tube scraper projectile assembly 100 may comprise a plurality of cutting elements 120*a-b* mounted to, coupled to, seated on, and/or otherwise disposed on the shaft 110. The cutting elements 120*a-b* may comprise, for example, a plurality of cutting arms 124*a-b*, each cutting arm 124*a-b* comprising a scrapping or cutting tool 126*a-b*. A first cutting element 120*a* may comprise a plurality of cutting arms 124*a* extending longitudinally along the axis with cutting tools 126*a* extending normal to the axis and oriented around the circumference of the tube scraper projectile assembly 100 (e.g., such that distal portions of the cutting tools 126*a* are oriented to engage in a scrapping or cutting action with an interior surface of a tube or pipe (not shown) in which the tube scraper projectile assembly 100 is inserted and/or propelled). A second cutting element 120*b* may also or alternatively comprise a plurality of cutting arms 124*b* extending longitudinally along the axis with cutting tools 126*b* extending normal to the axis and oriented around the circumference of the tube scraper projectile assembly 100 (e.g., such that distal portions of the cutting tools 126*b* are oriented to engage in a scrapping or cutting action with an interior surface of a tube or pipe (not shown) in which the tube scraper projectile assembly 100 is inserted and/or propelled).

According to some embodiments, the tube scraper projectile assembly 100 may comprise one or more radial biasing elements 130 mounted to, coupled to, seated on, and/or otherwise disposed on the shaft 110. The radial biasing element 130 (e.g., a first radial biasing element 130) may comprise, for example, a plurality of arcuate arms or beams 134 disposed longitudinally along the axis and/or nested with (e.g., underneath) the cutting arms 124*a* of the first cutting element 120*a* and/or the cutting arms 124*b* of the second cutting element 120*b*. The arcuate beams 134 may, for example, be forcibly nested with the cutting arms 124*a-b*, thereby asserting a biasing force against the underside of the cutting arms 124*a-b* and accordingly biasing the cutting tools 126*a-b* in an outward radial direction (e.g., to resistively engage an inside surface of a pipe or tube (not shown)). According to some embodiments, the radial biasing element 130 may comprise an arcuate beam 134 for each corresponding cutting arm 124*a-b*. In such a manner, for example, each arcuate beam 134 may be oriented in a particular circumferential position around the shaft 110

(and/or around or about the tube scraper projectile assembly 100) such that it aligns with a circumferential position of a corresponding cutting arm 124a-b (such as the cutting arms 124a of the first cutting element 120a, as depicted in FIG. 1A and FIG. 1B).

In some embodiments, the tube scraper projectile assembly 100 may comprise a piston element 140 mounted to, coupled to, seated on, and/or otherwise disposed on the shaft 110. The piston element 140 may comprise, for example, a body portion 140-1 disposed along the axis. According to some embodiments, the body portion 140-1 may be coupled to and/or comprise a radial biasing element 142 (e.g., a second radial biasing element 142) comprising a plurality of arcuate beams 144. The piston element 140 may be oriented along the axis, on the shaft 110, and/or may be disposed, for example, such that the arcuate beams 144 are nested or fitted with the cutting arms 124a-b (e.g., the cutting arms 124b of the second cutting element 120b, as shown). The arcuate beams 144 may, for example, be forcibly nested with the cutting arms 124a-b, thereby asserting a biasing force against the underside of the cutting arms 124a-b and accordingly biasing the cutting tools 126a-b in an outward radial direction (e.g., to resistively engage an inside surface of a pipe or tube (not shown)). According to some embodiments, the second radial biasing element 142 may comprise an arcuate beam 144 for each corresponding cutting arm 124a-b. In such a manner, for example, each arcuate beam 144 may be oriented in a particular circumferential position around the shaft 110 (and/or around or about the tube scraper projectile assembly 100) such that it aligns with a circumferential position of a corresponding cutting arm 124a-b (such as the cutting arms 124b of the second cutting element 120b, as depicted in FIG. 1A and FIG. 1B).

According to some embodiments, the piston element 140 may be coupled to the shaft 110 to retain the cutting elements 120a-b and the first radial biasing element 130 on the shaft 110 and/or on the tube scraper projectile assembly 100. The first cutting element 120a may be retained at the first end "A" of the shaft 110 (and/or the first end "A" of the tube scraper projectile assembly 100) by the stop portion 116, for example, and/or the piston element 140 may be removably coupled to the shaft 110 at or near the second end "B" of the shaft 110 (and/or the second end "B" of the tube scraper projectile assembly 100). In some embodiments, the engagement and/or coupling of the piston element 140 with the shaft 110 may be adjusted to vary the amount of axial pressure by which the tube scraper projectile assembly 100 is retained about or on the shaft 110. According to some embodiments, the piston element 140 may comprise a latch feature 146 that may be selectively engaged with the indexing feature 118-1 of the shaft 110.

In the case that the piston element 140 is coupled to the shaft 110 via threads (not shown in FIG. 1A or FIG. 1B), for example, a clock-wise (right-turn) rotational engagement of the piston element 140 with respect to the shaft 110 may urge the piston element 140 further onto the shaft 110 in the direction toward the first end "A" of the tube scraper projectile assembly 100, increasing a compressive axial force exerted by the piston element 140 on each of the cutting elements 120a-b and the first biasing element 130 (e.g., against the stop portion 116 of the shaft 110). In some embodiments, the increased compressive axial force may urge the arcuate beams 134, 144 further underneath their respectively-paired cutting arms 124a-b, which in turn causes an increase in the biasing forces exerted by the arcuate beams 134, 144 on the cutting arms 124a-b, thereby urging the cutting tools 126a-b further outward radially and/or increasing the resistive force imparted by the cutting tools 126a-b on an inside diameter of a tube or pipe (not shown). In some embodiments, the bore 116-1 of the shaft 110 may be shaped to receive a tool, e.g., a hex key or "Allen" key (not shown), via which tightening or loosening of the piston element 140 with respect to the shaft 110 may be facilitated. According to some embodiments, such as in the case that indexing feature 118-1 and the latch feature 146 are configured as depicted, rotational tightening and/or loosening of the piston element 140 may indexed at a variety of rotational positions. As depicted in FIG. 1A and FIG. 1B, for example, six (6) different latching or indexing positions are provided (e.g., via six (6) different indexing detents comprising the indexing feature 118-1) at sixty degree (60°) circumferential intervals about the shaft 110. Advancing the latch feature 146 from one indexing feature 118-1 position to the next, in accordance with some embodiments, requires an increased rotational force to urge the latch feature 146 axially away from the shaft 110. The latch feature 146 may, for example, comprise and/or include a biasing element that is biased toward the shaft 110 and/or is biased toward a default radial position, e.g., as shown, such as with the latch feature 146 fully engaged with or into one of the indexing feature 118-1 positions. In such a manner, for example, while the piston element 140 may be selectively indexed to a variety of positions with respect to the shaft 110, the biasing of the latch feature 146 may provide a rotational resistive force tending to maintain the latch feature 146 engagement with the indexing feature 118-1 during operational usage of the tube scraper projectile assembly 100.

In some embodiments, the piston element 140 may comprise a plurality of fins 148. The fins 148 may, for example, provide physically reactive surfaces facing the second end "B" of the tube scraper projectile assembly 100 such that a fluid propellant may impart movement to the tube scraper projectile assembly 100 by pushing against the fins 148, e.g., in the case that the tube scraper projectile assembly 100 is inserted into a tube or pipe (not shown).

According to some embodiments, any or all of the components 110, 116, 116-1, 120a-b, 124a-b, 126a-b, 130, 134, 140, 140-1, 142, 144, 146, 148 of the tube scraper projectile assembly 100 may be similar in configuration and/or functionality to any similarly named and/or numbered components described herein. Fewer or more components 110, 116, 116-1, 120a-b, 124a-b, 126a-b, 130, 134, 140, 140-1, 142, 144, 146, 148 (and/or portions thereof) and/or various configurations of the components 110, 116, 116-1, 120a-b, 124a-b, 126a-b, 130, 134, 140, 140-1, 142, 144, 146, 148 may be included in the tube scraper projectile assembly 100 without deviating from the scope of embodiments described herein. In some embodiments, one or more of the various components 110, 116, 116-1, 120a-b, 124a-b, 126a-b, 130, 134, 140, 140-1, 142, 144, 146, 148 may not be needed and/or desired in the tube scraper projectile assembly 100.

Figure 2A:
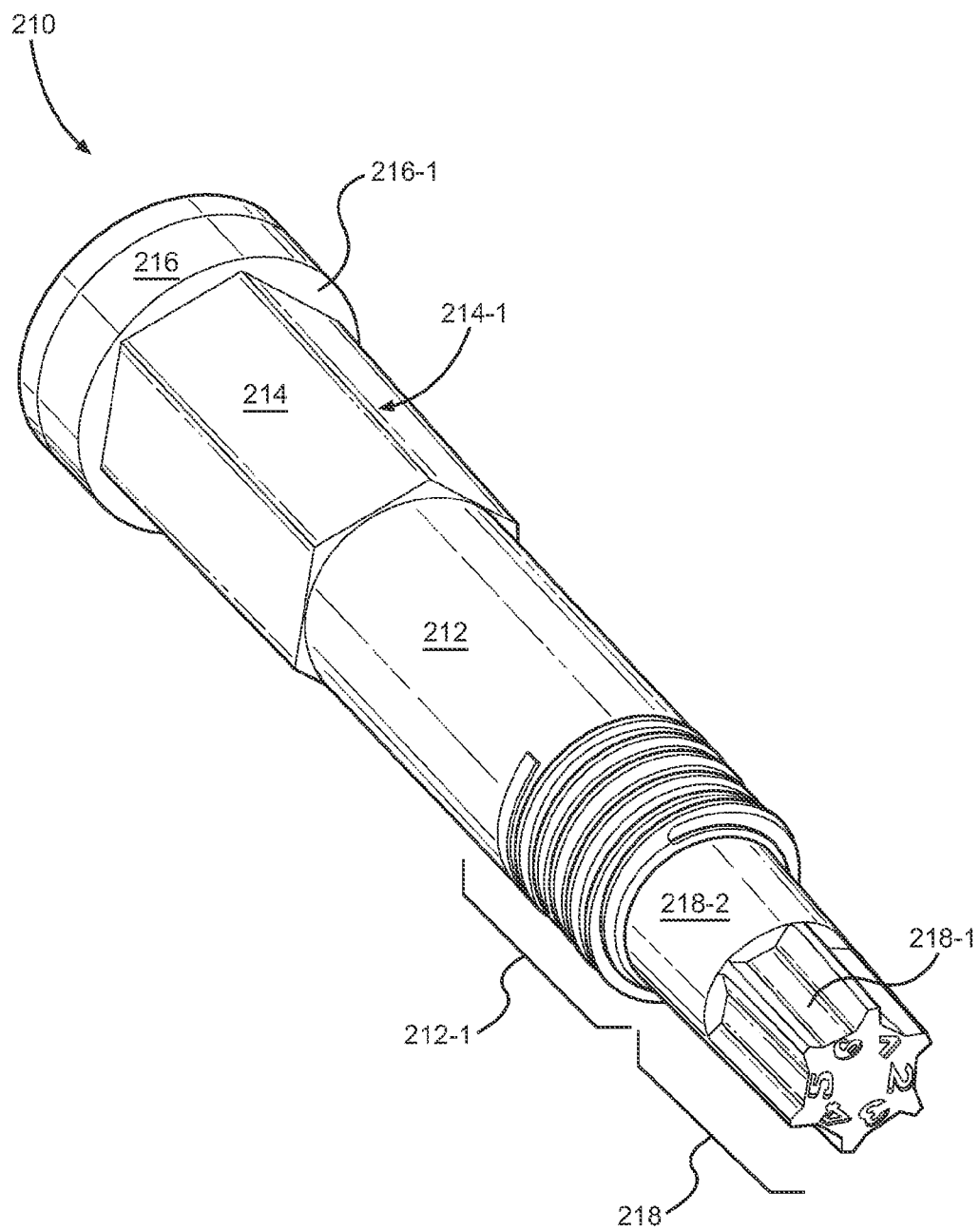
FIG. 2A is an upper, back-left perspective view of a tube scraper shaft element according to some embodiments.
Figure 2B:
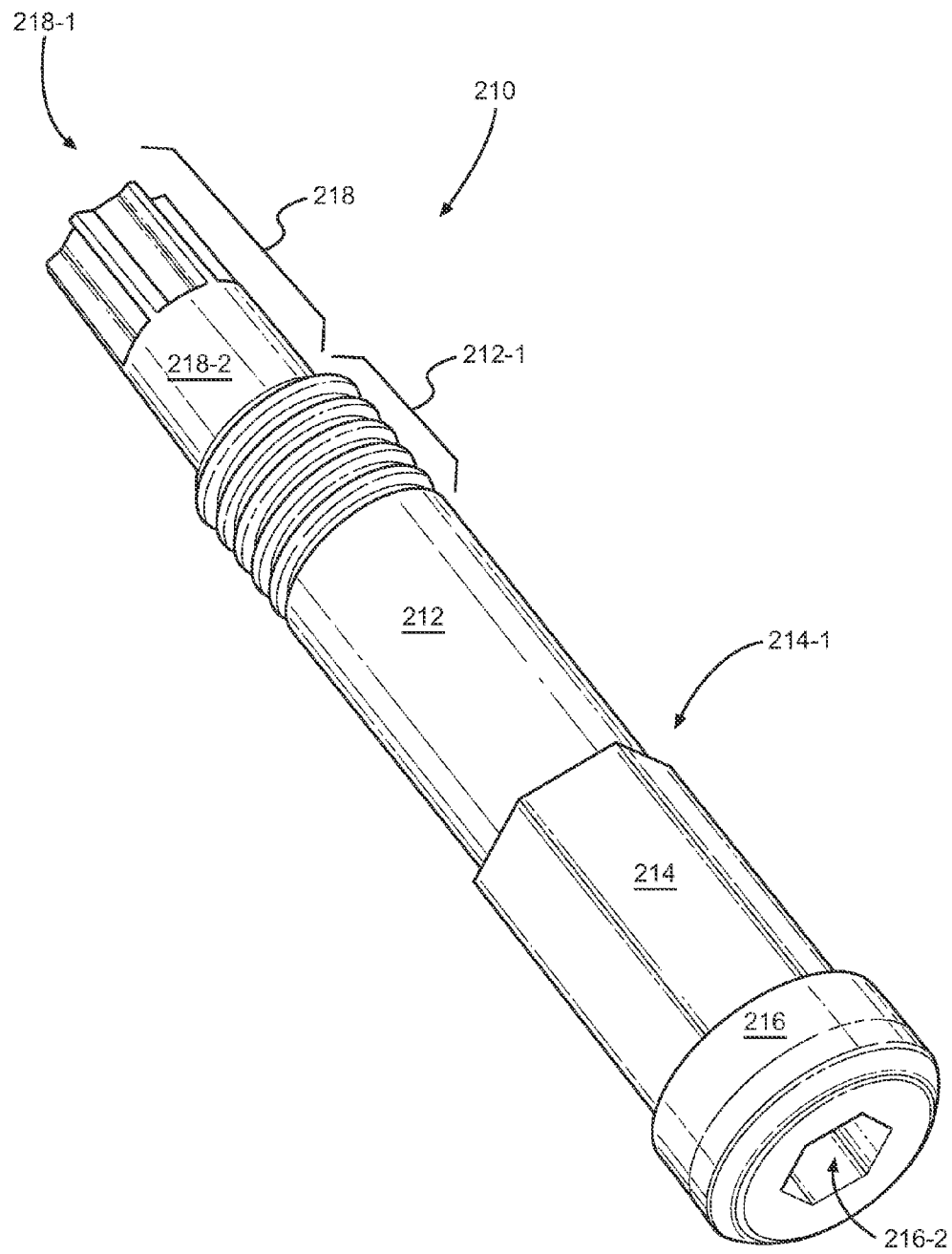
FIG. 2B is an upper, front-right perspective view of the tube scraper shaft element of FIG. 2A.

Referring now to FIG. 2A and FIG. 2B, an upper, back-left perspective view and an upper, front-right perspective view, respectively, of a tube scraper shaft element 210 according to some embodiments are shown. In some embodiments, the tube scraper shaft element 210 may be similar in configuration and/or functionality to the shaft 110 of FIG. 1A and FIG. 1B herein. According to some embodiments, the tube scraper shaft element 210 may comprise a cylindrical shaft portion 212, itself comprising a threaded portion 212-1. In some embodiments, the tube scraper shaft element 210 may comprise a shaped portion 214, such as the hexagonally-shaped shaft portion as depicted. According to some embodiments, the shaped portion 214 may be disposed and/or formed on a portion of the tube scraper shaft element 210 adjacent to a first end (not separately labeled) of the cylindrical shaft portion 212. According to some embodiments, the threaded portion 212-1 may be disposed and/or formed on a second end of the cylindrical shaft portion 212, e.g., distal from the shaped portion 214.

In some embodiments, the shaped portion 214 may define a plurality of vertices 214-1, such as six (6) vertices 214-1 defined as a result of the hexagonal shaped of the shaped portion 214 depicted in FIG. 2A and FIG. 2B. In some embodiments, the purpose of the shaped portion 214 and/or the vertices 214-1 may be to engage and/or mate with elements disposed on the tube scraper shaft element 210 (e.g., one or more cutting elements 120*a-b* and/or one or more radial biasing elements 130, such as described with respect to FIG. 1A and FIG. 1B herein) such that the rotational forces applied to the tube scraper shaft element 210 may be readily transferred to such engaged and/or mated components (e.g., the tube scraper shaft element 210 may cause elements coupled, mounted, and/or mated to the shaped portion 214 to rotate with the tube scraper shaft element 210). Accordingly, in some embodiments, different shapes and/or configurations of the shaped portion 214 and/or vertices 214-1 may be utilized to impart motion to components engaged with the tube scraper shaft element 210 (e.g., square shapes, octagonal shapes, keyed and/or dovetailed shapes, a cylindrical shape with a keyway and a key, etc.).

According to some embodiments, the tube scraper shaft element 210 may comprise a stop portion 216, e.g., disposed, coupled, and/or formed on an end of the shaped portion 214 opposite the cylindrical shaft portion 212. The stop portion 216 may comprise, for example, a portion of the tube scraper shaft element 210 with a diameter greater than each of the shaped portion 214 and the cylindrical shaft portion 212. In some embodiments, the stop portion 216 may comprise and/or define a stop surface 216-1 that is normal to the axis of the tube scraper shaft element 210. Components mated, coupled, and/or engaged with the shaped portion 214 and/or otherwise disposed on the tube scraper shaft element 210 (e.g., one or more cutting elements 120*a-b* and/or one or more radial biasing elements 130, such as described with respect to FIG. 1A and FIG. 1B herein) may, for example, interface with the stop surface 216-1, thereby preventing such elements from sliding off of the end of the tube scraper shaft element 210 at which the stop portion 216 is disposed. According to some embodiments, the stop portion 216 may comprise and/or define a bore 216-2. The bore 216-2 may, as depicted for example, be shaped to receive one or more tools such as a hex or "Allen" key which may, for example, facilitate steadying and/or rotation of the tube scraper shaft element 210 when the tube scraper shaft element 210 is mated, via the threaded portion 212-1 with threads of another element, device, and/or component (not shown in FIG. 2A or FIG. 2B; e.g., the piston element 140 of FIG. 1A and FIG. 1B).

In some embodiments, the tube scraper shaft element 210 may comprise an indexing portion 218. The indexing portion 218 may, for example, be formed and/or disposed at an end of the tube scraper shaft element 210 opposite from the stop portion 216. According to some embodiments, the indexing portion 218 may comprise one or more indexing and/or detent catch features 218-1 and/or a smooth shaft portion 218-2. In some embodiments, the detent catch features 218-1 may comprise a plurality of detents arranged around the circumference of the tube scraper shaft element 210 (and/or the indexing portion 218 thereof). As depicted, for example, the detent catch features 218-1 may comprise six (6) detent catch features 218-1 evenly-spaced around the circumference of the tube scraper shaft element 210 (e.g., on an end thereof that is opposite from the stop portion 216). In some embodiments, the detent catch features 218-1 may comprise a plurality of cuneate impressions in the shaft circumference, such that each detent catch feature 218-1 is operable to be engaged and/or mate with a detent latch feature (not shown in FIG. 2A or FIG. 2B; e.g., the detent latch feature 146 of the piston element 140 of FIG. 1A and FIG. 1B herein) comprising a cuneal projection. While six (6) detent catch features 218-1 spaced at sixty degree (60°) circumferential intervals about the tube scraper shaft element 210 (and/or the indexing portion 218 thereof) are depicted, other quantities and/or configurations of detent catch features 218-1 may be utilized in some embodiments. The detent catch features 218-1 may comprise one or more detents, channels, keys, projections, tabs, and/or other objects or voids, for example, configured to engage with a corresponding one or more compatible features of an element (not shown in FIG. 2A or FIG. 2B; e.g., the piston element 140 of FIG. 1A and FIG. 1B) mated, coupled, and/or engaged with and/or otherwise disposed on the tube scraper shaft element 210.

According to some embodiments, any or all of the components 212, 212-1, 214, 214-1, 216, 216-1, 216-2, 218, 218-1, 218-2 of the tube scraper shaft element 210 may be similar in configuration and/or functionality to any similarly named and/or numbered components described herein. Fewer or more components 212, 212-1, 214, 214-1, 216, 216-1, 216-2, 218, 218-1, 218-2 (and/or portions thereof) and/or various configurations of the components 212, 212-1, 214, 214-1, 216, 216-1, 216-2, 218, 218-1, 218-2 may be included in the tube scraper shaft element 210 without deviating from the scope of embodiments described herein. In some embodiments, one or more of the various components 212, 212-1, 214, 214-1, 216, 216-1, 216-2, 218, 218-1, 218-2 may not be needed and/or desired in the tube scraper shaft element 210.

Figure 3A:
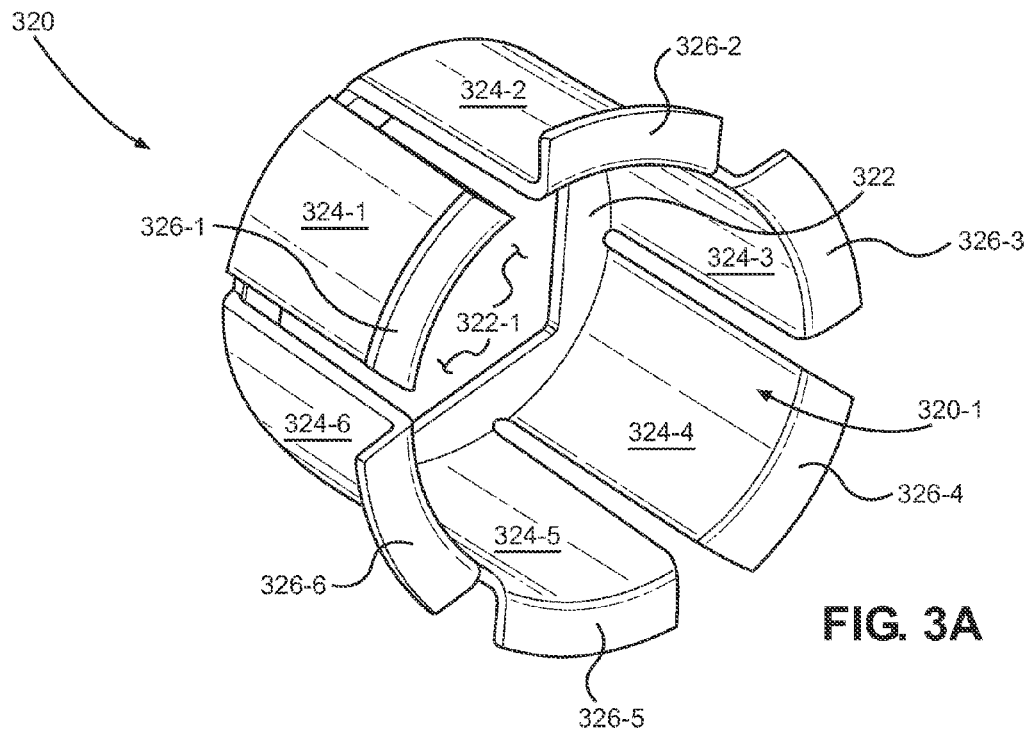
FIG. 3A is an upper, back-left perspective view of a tube scraper blade element according to some embodiments.
Figure 3B:
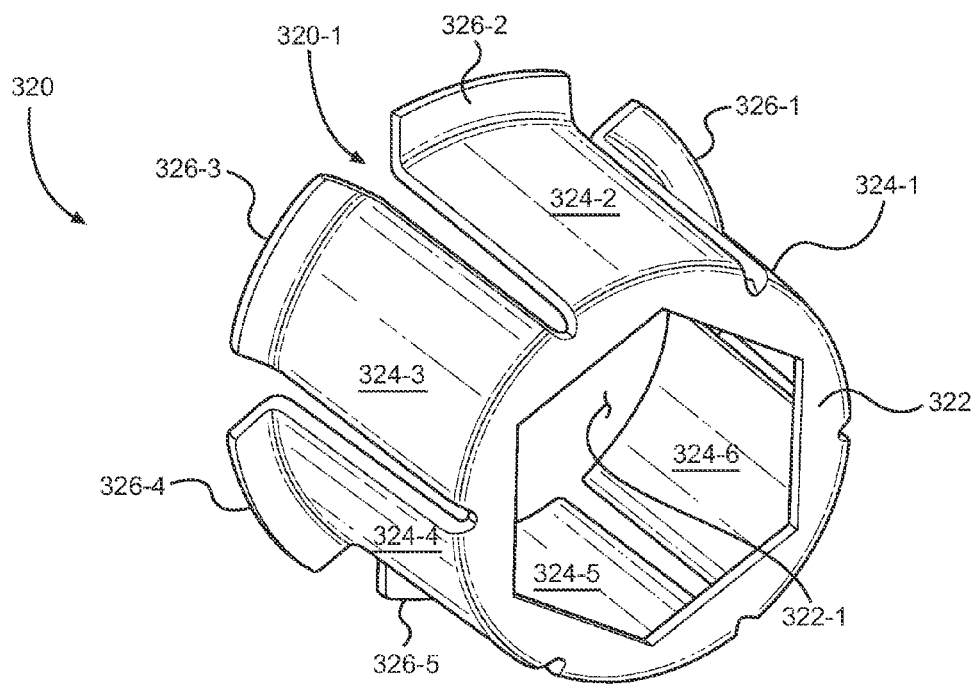
FIG. 3B is an upper, front-right perspective view of the tube scraper blade element of FIG. 3A.

Turning now to FIG. 3A and FIG. 3B, an upper, back-left perspective view and an upper, front-right perspective view, respectively, of a tube scraper blade element 320 according to some embodiments are shown. In some embodiments, the tube scraper blade element 320 may be similar in configuration and/or functionality to either or both of the cutting elements 120*a-b* of FIG. 1A and FIG. 1B herein. In some embodiments, the tube scraper blade element 320 may comprise a generally cylindrically-shaped, hollow element, defining an interior volume or void 320-1. The tube scraper blade element 320 may comprise, for example, a base portion 322 of the cylinder-shape at one end of the tube scraper blade element 320, with the other end being open, and the interior void 320-1 being disposed in between.

According to some embodiments, the base portion 322 may comprise a circular and/or disc-shaped element. In some embodiments, the base portion 322 may be referred to as an annular base 322 or an annular cutting element base 322. The base element 322 may, for example, comprise a circular and/or disc-shaped element defining an orifice 322-1 there through. In some embodiments, the orifice 322-1 may be circularly-shaped to define a 'true' annular base 322. According to some embodiments, the orifice 322-1 may alternatively be shaped, such as the hexagonal shaped orifice 322-1 depicted in FIG. 3A and FIG. 3B. In such cases, the base portion 322 may still be referred to as an annular base 322, for convenience. According to some embodiments, the orifice 322-1 may be shaped to engage and/or mate with a shaft (not shown in FIG. 3A or FIG. 3B; e.g., the tube scraper shaft element 210 (and/or the shaped portion 214 thereof).

In some embodiments, the tube scraper blade element 320 may comprise a plurality of scrapper or cutting arms 324 extending from an outer diameter of the annular base 322 longitudinally along the cylinder shape and/or defining the walls of the cylinder shape. The plurality of cutting arms 324 may, for example, define the radial extents of the interior void 320-1. As depicted in FIG. 3A and FIG. 3B, in some embodiments the cutting arms 324 may be formed from a cylindrical wall of the tube scraper blade element 320 being cut, formed, and/or separated, into a plurality of independent longitudinal elements. In some embodiments, such independent longitudinal cutting arms 324 may comprise pliable and/or elastic elements—e.g., that are receptive to receiving a radial biasing force to urge the cutting arms 324 radially from their default cylindrically-shaped positions, e.g., to pivot at their attachment to the annular base 322. According to some embodiments (as depicted), the tube scraper blade element 320 may comprise and/or define six (6) cutting arms 324 (a first cutting arm 324-1, a second cutting arm 324-2, a third cutting arm 324-3, a fourth cutting arm 324-4, a fifth cutting arm 324-5, and/or a sixth cutting arm 324-6).

According to some embodiments, each cutting arm 324 may comprise a scrapper or cutting element or tool 326. The cutting tools 326 may, for example, comprise portions of the cutting arms 324 angled radially outward from the basic cylindrical shape defined by the cutting arms 324. In some embodiments, the cutting tools 326 may be oriented normal to a cylindrical axis (not explicitly shown in FIG. 3A or FIG. 3B) of the tube scraper blade element 320. In such a manner, for example, in the case that the tube scraper blade element 320 is inserted into a closed conduit (not shown) such as a pipe or tube (e.g., a chiller tube), the cutting tools 326 may be disposed to scrape or cut deposits formed on the inside surface of the closed conduit. In some embodiments, the cutting tools 326 may be angled and/or bent at an angle of less than ninety degrees (90°) with respect to the cutting arms 324. In some embodiments, different cutting tools 326 may be angled and/or disposed differently with respect to other cutting tools 326. According to some embodiments, such as in the case that the tube scraper blade element 320 comprises and/or defines six (6) cutting arms 324, the tube scraper blade element 320 may accordingly comprise six (6) cutting tools 326 (a first cutting tool 326-1, a second cutting tool 326-2, a third cutting tool 326-3, a fourth cutting tool 326-4, a fifth cutting tool 326-5, and/or a sixth cutting tool 326-6). In some embodiments, instead of being formed from bent/angled portions of the cutting arms 324 as shown, the cutting tools 326 may be coupled to the cutting arms 324 (e.g., welded, screwed, adhered to, and/or otherwise attached).

According to some embodiments, any or all of the components 320-1, 322, 322-1, 324-1, 324-2, 324-3, 324-4, 324-5, 324-6, 326-1, 326-2, 326-3, 326-4, 326-5, 326-6 of the tube scraper blade element 320 may be similar in configuration and/or functionality to any similarly named and/or numbered components described herein. Fewer or more components 320-1, 322, 322-1, 324-1, 324-2, 324-3, 324-4, 324-5, 324-6, 326-1, 326-2, 326-3, 326-4, 326-5, 326-6 (and/or portions thereof) and/or various configurations of the components 320-1, 322, 322-1, 324-1, 324-2, 324-3, 324-4, 324-5, 324-6, 326-1, 326-2, 326-3, 326-4, 326-5, 326-6 may be included in the tube scraper blade element 320 without deviating from the scope of embodiments described herein. In some embodiments, one or more of the various components 320-1, 322, 322-1, 324-1, 324-2, 324-3, 324-4, 324-5, 324-6, 326-1, 326-2, 326-3, 326-4, 326-5, 326-6 may not be needed and/or desired in the tube scraper blade element 320.

Figure 4A:
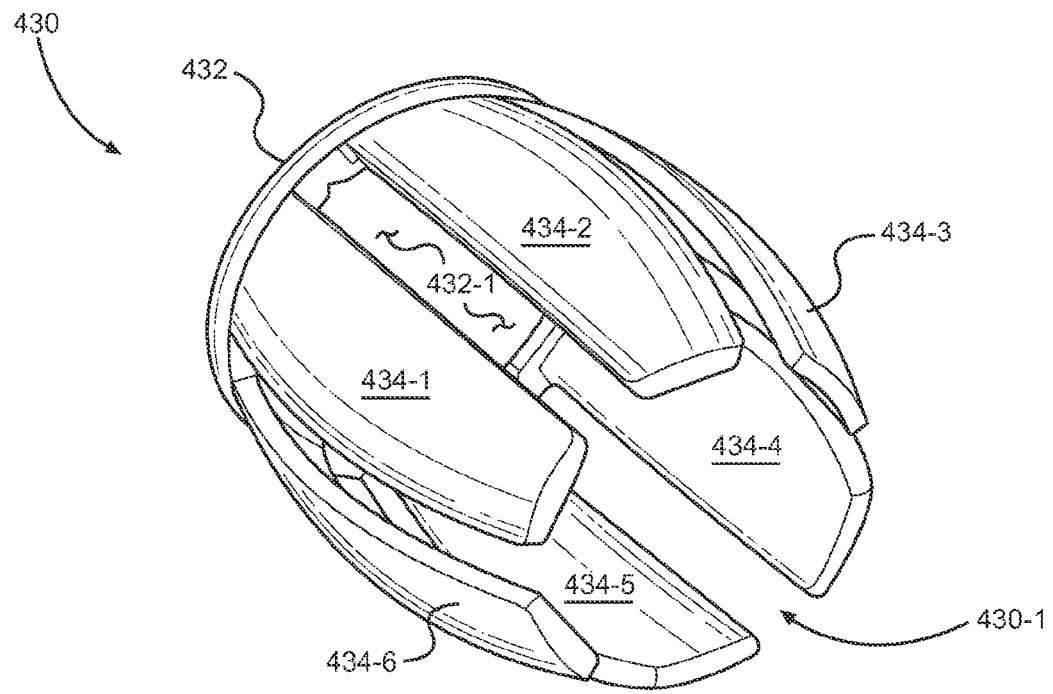
FIG. 4A is an upper, back-left perspective view of a tube scraper biasing element according to some embodiments.
Figure 4B:
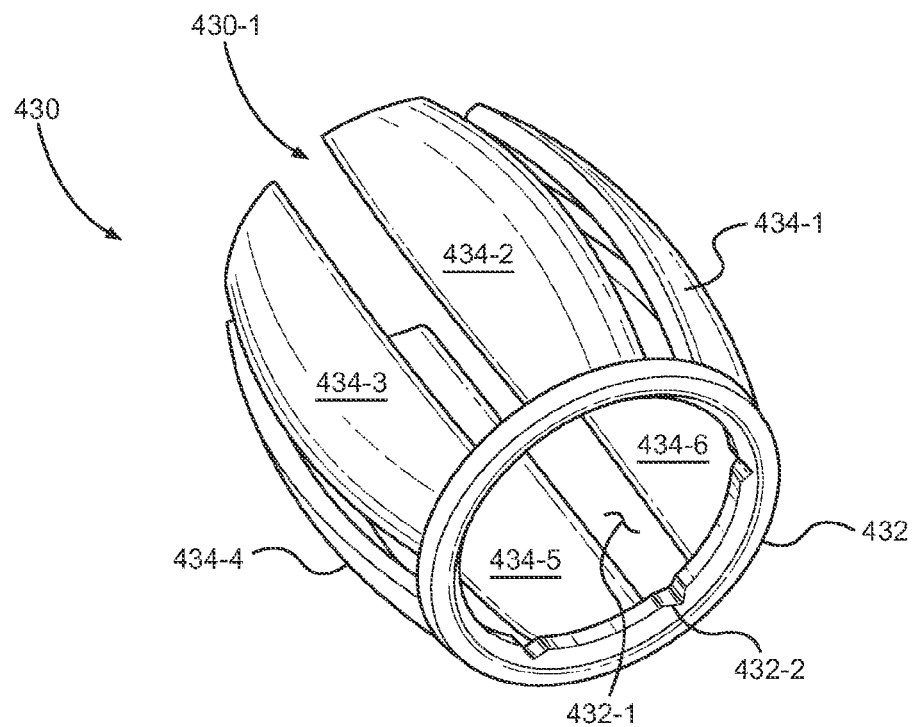
FIG. 4B is an upper, front-right perspective view of the tube scraper biasing element of FIG. 4A.

Referring now to FIG. 4A and FIG. 4B, an upper, back-left perspective view and an upper, front-right perspective view, respectively, of a tube scraper biasing element 430 according to some embodiments are shown. In some embodiments, the tube scraper biasing element 430 may be similar in configuration and/or functionality to either or both of the biasing elements 130, 142 of FIG. 1A and FIG. 1B herein. In some embodiments, the tube scraper biasing element 430 may comprise a generally barrel-shaped (e.g., a hollow cylindrical shaped that is convex along the sides) element, defining an interior volume or void 430-1. The tube scraper biasing element 430 may comprise, for example, a base portion 432 of the barrel-shape at one end of the tube scraper biasing element 430, with the other end being open, and the interior void 430-1 being disposed in between. In some embodiments (not shown), the tube scraper biasing element 430 generally comprise a cylindrically-shaped, hollow element, e.g., defining the interior void 430-1.

According to some embodiments, the base portion 432 may comprise a circular and/or disc-shaped element. In some embodiments, the base portion 432 may be referred to as an annular base 432 or an annular biasing element base 432. The base element 432 may, for example, comprise a circular and/or disc-shaped element defining an orifice 432-1 there through. In some embodiments (as shown), the orifice 432-1 may be circularly-shaped to define a 'true' annular base 432. According to some embodiments, the orifice 432-1 may alternatively be shaped, such as hexagonally or octagonally shaped. In such cases, the base portion 432 may still be referred to as an annular base 432, for convenience. According to some embodiments, the orifice 432-1 may be shaped to engage and/or mate with a shaft (not shown in FIG. 4A or FIG. 4B; e.g., the tube scraper shaft element 210 (and/or the shaped portion 214 thereof). The orifice 432-1 and/or the annular base 432 may comprise, for example, a plurality of engagement detents 432-2, as depicted in FIG. 4A and FIG. 4B. The engagement detents 432-2 may, for example, be formed to receive vertices and/or projections of a shaft (e.g., the vertices 214-1 of the shaped portion 214 of the shaft 210 of FIG. 2A and FIG. 2B herein) such that rotation of the shaft imparts rotational force to the tube scraper biasing element 430.

In some embodiments, the tube scraper biasing element 430 may comprise a plurality of arcuate arms or beams 434 extending from an outer diameter of the annular base 432 longitudinally along the barrel/convex shape and/or defining the walls of the barrel/convex shape. The plurality of arcuate beams 434 may, for example, define the radial extents of the interior void 430-1. As depicted in FIG. 4A and FIG. 4B, in some embodiments the arcuate beams 434 may be formed from a barrel/convex wall of the tube scraper biasing element 430 being cut, formed, and/or separated, into a plurality of independent longitudinal elements. In some embodiments, such independent longitudinal arcuate beams 434 may comprise elastic and/or pliable elements—e.g., that are receptive to receiving and/or providing a radial biasing force to urge the arcuate beams 434 radially from their default barrel-shaped positions, e.g., to pivot at their attachment to the annular base 432. In some embodiments, the convex shape of the arcuate beams 434 may also provide an axial biasing feature to the arcuate beams 434 such that pressure applied axially to the arcuate beams 434 is elastically resisted by the arcuate beams 434. In some embodiments (not shown), the beams 434 may (e.g., instead of or in addition to being arcuate) comprise straight arm/beam elements. In some embodiments, such straight arm/beam elements may comprise a tapered thickness—e.g., thickness decreases as the extents of the beams are approached, e.g., in a linear fashion in some embodiments. Such a tapered and/or non-biasing beam configuration may, for example, provide varying resistance to forces applied (e.g., radially inward) to any cutting arms (not shown in FIG. 4A or FIG. 4B) that the beams are paired with (e.g., as described herein) and/or support. In the case that a tapered beam is interfaced with a cutting arm near the tip of the beam where the thickness is relatively small, for example, resistance to bending is also small and a relatively small amount of resistance to cutting arm deflection may be provided. In the case the tapered beam is interfaced with the cutting arm away from the tip of the beam (e.g., mid-way along the beam or proximate to the base of the beam) where the thickness is relatively large, for example, resistance to bending is also large and a relatively large amount of resistance to cutting arm deflection may be provided. Such may also be the case where a straight, uniform thickness beam is utilized, but the varying resistive force/effect will be less pronounced than with a tapered beam thickness being employed. In either case, for example, a tapered-thickness and/or uniform thickness non-arcuate beam 434 may be provided and selectively inserted into a cutting arm void (as described herein) to vary a radial resistive force provided by the tapered-thickness and/or uniform thickness non-arcuate beam 434.

According to some embodiments (as depicted), the tube scraper biasing element 430 may comprise and/or define six (6) arcuate beams 434 (a first arcuate beam 434-1, a second arcuate beam 434-2, a third arcuate beam 434-3, a fourth arcuate beam 434-4, a fifth arcuate beam 434-5, and/or a sixth arcuate beam 434-6). According to some embodiments, each of the arcuate beams 434 may be oriented to apply a biasing force to (and/or to receive a biasing force from) a cutting arm (not shown in FIG. 4A and FIG. 4B; e.g., the cutting arms 324 of the tube scraper blade element 320 of FIG. 3A and FIG. 3B herein). The arcuate beams 434 may, for example, be inserted, fitted, and/or forced into an internal void defined by a plurality of cutting arms (not shown in FIG. 4A and FIG. 4B; e.g., the internal void 320-1 of the tube scraper blade element 320 of FIG. 3A and FIG. 3B herein). In such embodiments, the further the arcuate beams 434 are inserted into such a void (e.g., the further the arcuate beams 434 are urged to interfere and/or interface with the undersides of the respective cutting arms), the more outward radial biasing pressure is exerted on the cutting arms by the arcuate beams 434, with a maximum radial biasing pressure being exerted, for example, upon engagement of the apex of the convex shape of an arcuate beam 434 with a respective force-receiving surface of a pliable and/or elastic cutting arm member.

According to some embodiments, any or all of the components 430-1, 432, 432-1, 434-1, 434-2, 434-3, 434-4, 434-5, 434-6 of the tube scraper biasing element 430 may be similar in configuration and/or functionality to any similarly named and/or numbered components described herein. Fewer or more components 430-1, 432, 432-1, 434-1, 434-2, 434-3, 434-4, 434-5, 434-6 (and/or portions thereof) and/or various configurations of the components 430-1, 432, 432-1, 434-1, 434-2, 434-3, 434-4, 434-5, 434-6 may be included in the tube scraper biasing element 430 without deviating from the scope of embodiments described herein. In some embodiments, one or more of the various components 430-1, 432, 432-1, 434-1, 434-2, 434-3, 434-4, 434-5, 434-6 may not be needed and/or desired in the tube scraper biasing element 430.

Figure 5A:
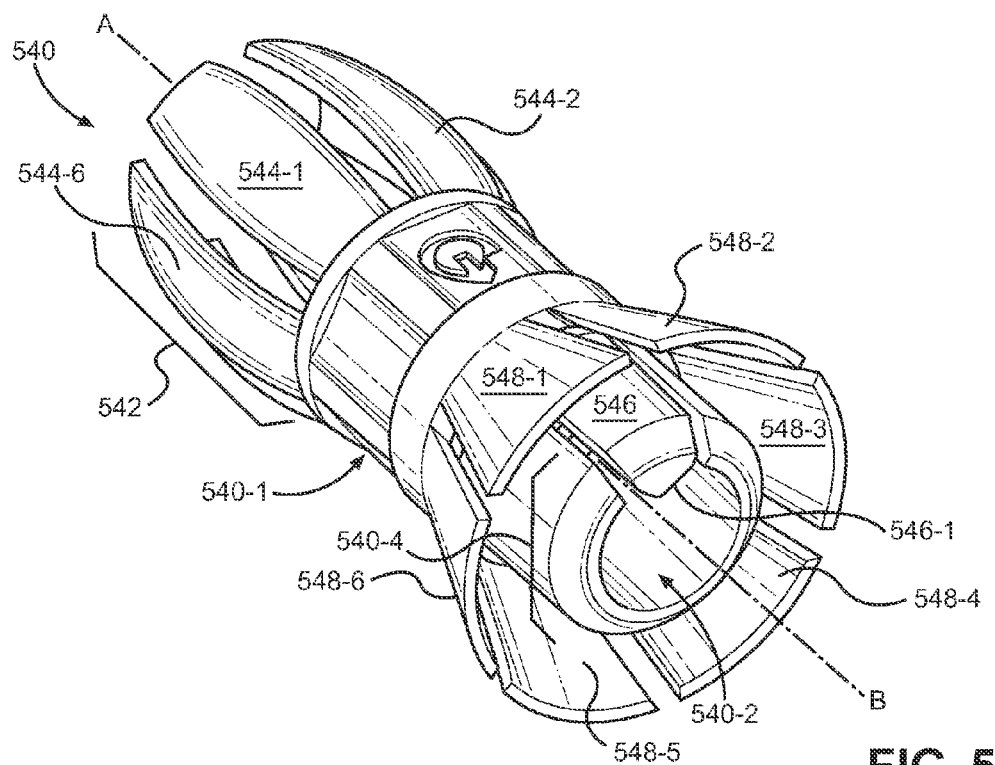
FIG. 5A is an upper, back-left perspective view of a tube scraper piston element according to some embodiments.
Figure 5B:
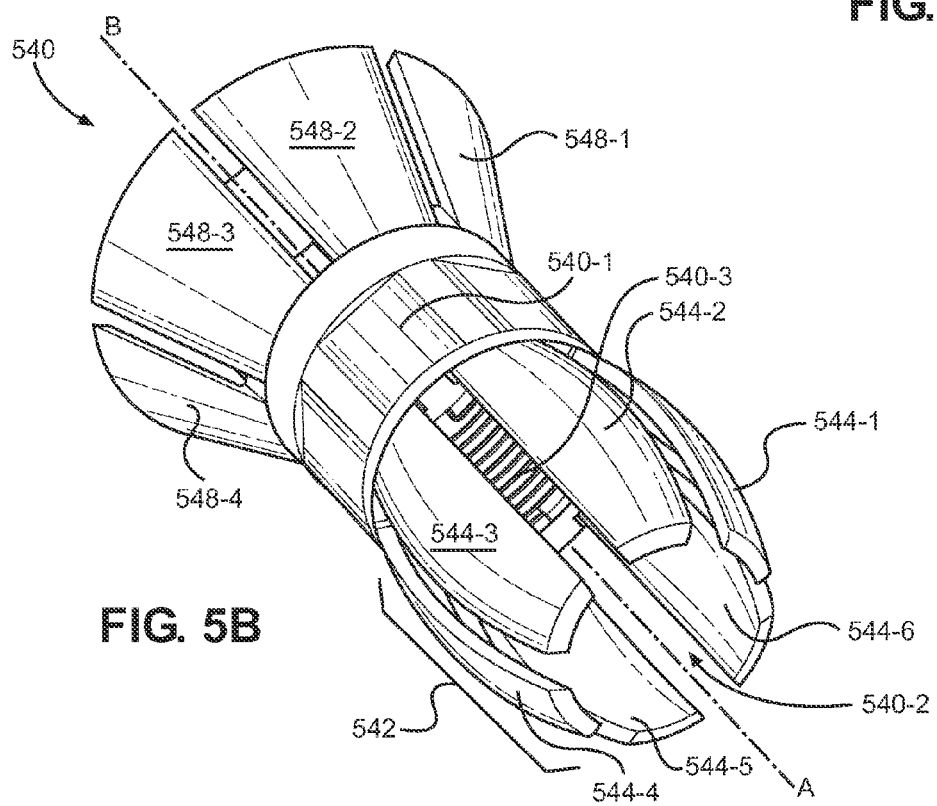
FIG. 5B is an upper, front-right perspective view of the tube scraper piston element of FIG. 5A.

Referring now to FIG. 5A and FIG. 5B, an upper, back-left perspective view and an upper, front-right perspective view, respectively, of a tube scraper piston element 540 according to some embodiments are shown. In some embodiments, the tube scraper piston element 540 may be similar in configuration and/or functionality to the piston element 140 of FIG. 1A and FIG. 1B herein. In some embodiments, the tube scraper piston element 540 may be disposed along an axis and be identifiable as having a first end "A" and a second end "B", as shown. In some embodiments, the tube scraper piston element 540 may comprise a body portion 540-1 that is generally cylindrically shaped. According to some embodiments, the body portion 540-1 may be hollow and/or may otherwise comprise and/or define a bore 540-2 there through. According to some embodiments, the bore 540-2 (and/or the inside diameter of the body element 540-1) may comprise a threaded portion 540-3. The interior threaded portion 540-3 may be operable to accept, for example, mating threads of a shaft (not shown in FIG. 5A or FIG. 5B; e.g., the threaded portion 212-1 of the shaft 210 of FIG. 2A and FIG. 2B herein) inserted into the bore 540-2.

In some embodiments, the tube scraper piston element 540 may comprise a biasing element 542 formed at and/or coupled to one end of the body portion 540-1 proximate to the first end "A" of the tube scraper piston element 540. The biasing element 542 may, in some embodiments, comprise a generally barrel-shaped (e.g., a hollow cylindrical shaped that is convex along the sides) portion, defining a portion of the bore 540-2 and/or an interior volume or void at least partially defined by the bore 540-2. The biasing element 542 may comprise, for example, a plurality of arcuate arms or beams 544 extending from an outer diameter of the body portion 540-1 and extending longitudinally along the barrel/convex shape and/or defining the walls of the barrel/convex shape, e.g., along the axis toward the first end "A" of the tube scraper piston element 540. As depicted in FIG. 5A and FIG. 5B, in some embodiments the arcuate beams 544 may be formed from a barrel/convex wall of the biasing element 542 being cut, formed, and/or separated, into a plurality of independent longitudinal elements. In some embodiments, such independent longitudinal arcuate beams 544 may comprise elastic and/or pliable elements—e.g., that are receptive to receiving and/or providing a radial biasing force to urge the arcuate beams 544 radially from their default barrel-shaped positions, e.g., to pivot at their attachment to the body portion 540-1. In some embodiments, the convex shape of the arcuate beams 544 may also provide an axial biasing feature to the arcuate beams 544 such that pressure applied axially to the arcuate beams 544 is elastically resisted by the arcuate beams 544.

According to some embodiments (as depicted), the biasing element 542 may comprise and/or define six (6) arcuate beams 544 (a first arcuate beam 544-1, a second arcuate beam 544-2, a third arcuate beam 544-3, a fourth arcuate beam 544-4, a fifth arcuate beam 544-5, and/or a sixth arcuate beam 544-6). According to some embodiments, each of the arcuate beams 544 may be oriented to apply a biasing force to (and/or to receive a biasing force from) a cutting arm (not shown in FIG. 5A and FIG. 5B; e.g., the cutting arms 324 of the tube scraper blade element 320 of FIG. 3A and FIG. 3B herein). The arcuate beams 544 may, for example, be inserted, fitted, and/or forced into an internal void defined by a plurality of cutting arms (not shown in FIG. 5A and FIG. 5B; e.g., the internal void 320-1 of the tube scraper blade element 320 of FIG. 3A and FIG. 3B herein). In such embodiments, the further the arcuate beams 544 are inserted into such a void (e.g., the further the arcuate beams 544 are urged to interfere and/or interface with the undersides of the respective cutting arms), the more outward radial biasing pressure is exerted on the cutting arms by the arcuate beams 544, with a maximum radial biasing pressure being exerted, for example, upon engagement of the apex of the convex shape of an arcuate beam 544 with a respective force-receiving surface of a pliable and/or elastic cutting arm member.

In some embodiments, the tube scraper piston element 540 may comprise a latch feature 546. The latch feature 546 may, for example, comprise an elastic and/or pliable portion of the tube scraper piston element 540 at the second end "B" thereof. As depicted, the latch portion 546 may comprise a portion of the cylindrically-shaped body portion 540-1 that is formed and/or cut separately, for a portion of the circumference thereof (e.g., for approximately sixty degrees (60°) radially of the entire cylindrical shape of the body portion 540-1). According to some embodiments, the latch feature 546 may comprise a projection 546-1 shaped to be received by and/or mated with a catch feature of a shaft (not shown in FIG. 5A and FIG. 5B; e.g., the detent catch feature 218-1 of the shaft 210 of FIG. 2A and FIG. 2B herein). As depicted, for example, the projection 546-1 may comprise a cuneal projection 546-1 operable to be received by a cuneate detent of a shaft inserted through the bore 540-2. In such a case, the latch feature 546 may be referred to as a detent latch feature 546. While the latch feature 546 is shown as comprising the projection 546-1, in some embodiments other shapes and/or configurations of features may also or alternatively be provided—such as a detent (not shown) to accept a projection from a shaft (also not shown).

According to some embodiments, the tube scraper piston element 540 may comprise a plurality of fins 548 extending (e.g., longitudinally) from an outer diameter of the body portion 540-1 proximate to the second end "B" of the tube scraper piston element 540 (e.g., opposite from the biasing element 542). In some embodiments, the plurality of fins 548 may be angled toward the second end "B" of the tube scraper piston element 540, thereby defining a frusto conical void 540-4 at the second end "B". The frusto conical void 540-4 may, for example, be operable to accept pressurized fluid flow (not shown) and thereby relay an axial pushing force from the pressurized fluid flow (e.g., in the direction of the first end "A") to the tube scraper piston element 540.

In some embodiments (as depicted), the tube scraper piston element 540 may comprise and/or define six (6) fins 548 (a first fin 548-1, a second fin 548-2, a third fin 548-3, a fourth fin 548-4, a fifth fin 548-5, and/or a sixth fin 548-6). According to some embodiments, each of the fins 548 may be oriented to accept a fluid force at a circumferential position about the tube scraper piston element 540 that aligns with a circumferential position of one of the arcuate beams 544-1, 544-2, 544-3, 544-4, 544-5, 544-6.

According to some embodiments, any or all of the components 540-1, 540-2, 540-3, 540-4, 542, 544-1, 544-2, 544-3, 544-4, 544-5, 544-6, 546, 546-1, 548-1, 548-2, 548-3, 548-4, 548-5, 548-6 of the tube scraper piston element 540 may be similar in configuration and/or functionality to any similarly named and/or numbered components described herein. Fewer or more components 540-1, 540-2, 540-3, 540-4, 542, 544-1, 544-2, 544-3, 544-4, 544-5, 544-6, 546, 546-1, 548-1, 548-2, 548-3, 548-4, 548-5, 548-6 (and/or portions thereof) and/or various configurations of the components 540-1, 540-2, 540-3, 540-4, 542, 544-1, 544-2, 544-3, 544-4, 544-5, 544-6, 546, 546-1, 548-1, 548-2, 548-3, 548-4, 548-5, 548-6 may be included in the tube scraper piston element 540 without deviating from the scope of embodiments described herein. In some embodiments, one or more of the various components 540-1, 540-2, 540-3, 540-4, 542, 544-1, 544-2, 544-3, 544-4, 544-5, 544-6, 546, 546-1, 548-1, 548-2, 548-3, 548-4, 548-5, 548-6 may not be needed and/or desired in the tube scraper piston element 540.

Figure 6:
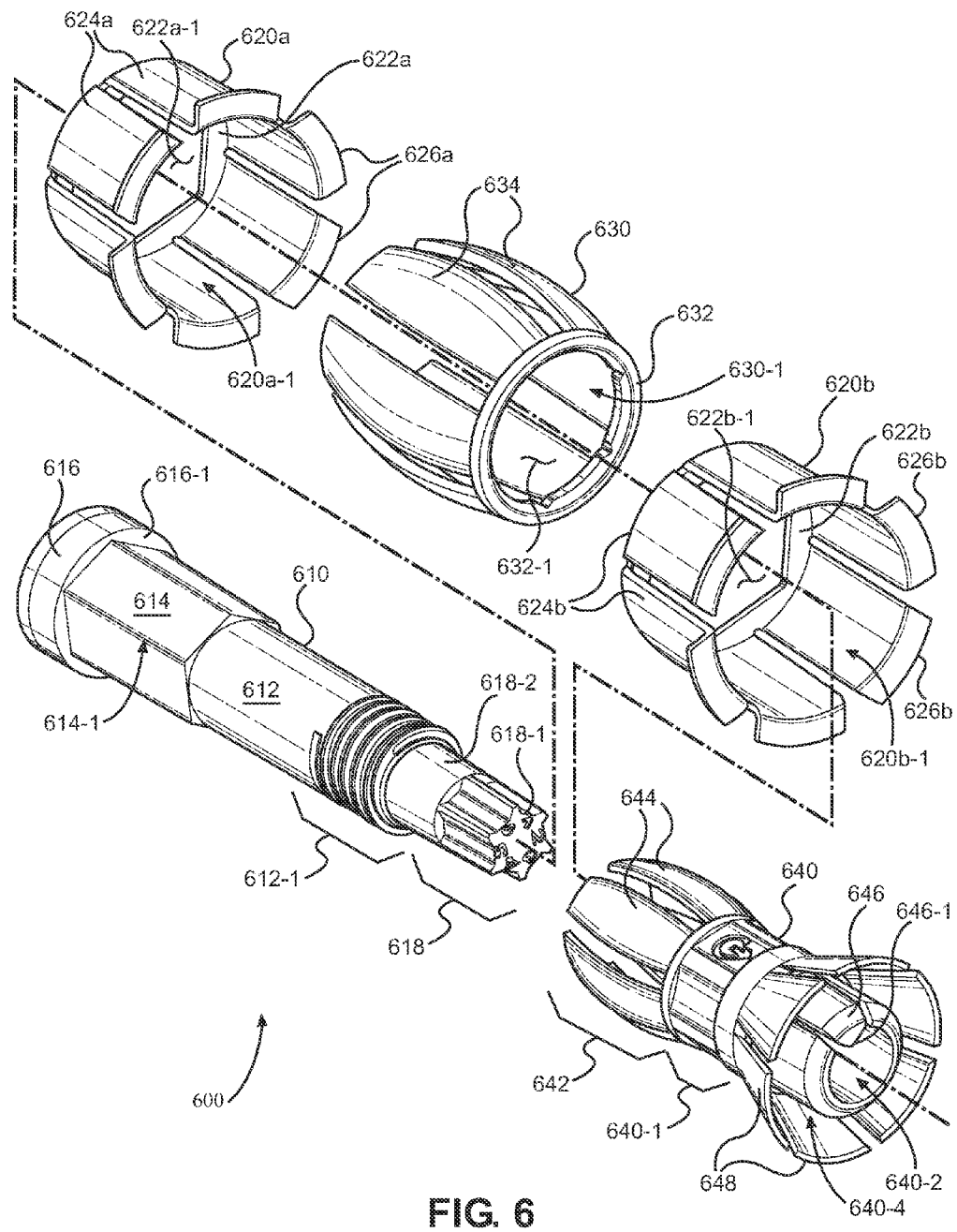
FIG. 6 is an upper, back-left perspective assembly view of a tube scraper projectile assembly according to some embodiments.

Turning now to FIG. 6, an upper, back-left perspective assembly view of a tube scraper projectile assembly 600 according to some embodiments is shown. In some embodiments, the tube scraper projectile assembly 600 may comprise a shaft 610 comprising a cylindrical shaft portion 612, a threaded portion 612-1, a shaped shaft portion 614, shaped shaft vertices 614-1, a stop portion 616, a stop surface 616-1, an indexing portion 618, a plurality of indexing features 618-1, and/or a smooth shaft portion 618-2. In some embodiments, the tube scraper projectile assembly 600 may comprise a plurality of cutting elements 620*a-b* mounted to, coupled to, seated on, and/or otherwise disposed on the shaft 610. The cutting elements 620*a-b* may define interior volumes or voids 620*a*-1, 620*b*-1 and/or may comprise, for example, base portions 622*a-b* defining orifices 622*a*-1, 622*b*-1, and/or a plurality of cutting arms 624*a-b*, each cutting arm 624*a-b* comprising a scrapping or cutting tool 626*a-b*. According to some embodiments, a first cutting element 620*a* may inserted onto the shaft 610 with a first cutting element base portion 622*a* thereof engaging with the stop surface 616-1. A first shaped orifice 622*a*-1 of the first cutting element 620*a* may, for example, be inserted onto the shaped portion 614 of the shaft 610, thereby engaging the first cutting element 620*a* with the shaft 610.

In some embodiments, the tube scraper projectile assembly 600 may comprise a first biasing element 630. The first biasing element 630 may define an interior volume or void 630-1 and/or may comprise, for example, a base portion 632 defining an orifice 632-1 and/or a plurality of arcuate beams 634 extending longitudinally/axially from an outer diameter of the base portion 632. According to some embodiments, the first biasing element 630 may be inserted onto the shaft 610 with the arcuate beams 634 extending into a first interior void 620*a*-1 of the first cutting element 620*a* (e.g., the arcuate beams 634 may be nested with or underneath first cutting arms 624*a* of the first cutting element 620*a*). In some embodiments, a second cutting element 620*b* may be inserted onto the shaft 610 with a second cutting element base 622*b* thereof contacting (and/or mating or coupling with) the base portion 632 of the first biasing element 630. In some embodiments, a second shaped orifice 622*b*-1 of the second cutting element 620*b* may, for example, be inserted onto the shaped portion 614 of the shaft 610, thereby engaging the second cutting element 620*b* with the shaft 610. While the second cutting element 620*b* and the first biasing element 630 are depicted as being separate elements in FIG. 6, in some embodiments they may be provided as coupled or joined elements or as a single element, as is or becomes desirable or practicable.

According to some embodiments, the tube scraper projectile assembly 600 may comprise a piston element 640. The piston element 640 may comprise a body portion 640-1 having a bore 640-2, for example, and/or may comprise a second biasing element 642 having a plurality of arcuate beams 644, a latch feature 646 having a latch projection 646-1, and/or a plurality of fins 648 defining a propellant void 640-4. While the second biasing element 642 is depicted as being integral to and/or part of the piston element 640, in some embodiments the second biasing element 642 may comprise a separate element than the piston element 640.

In some embodiments, the piston element 640 may be inserted onto and/or engaged with the shaft 610. The arcuate beams 644 of the second biasing portion 642 may, for example, be extended into a second interior void 620*b*-1 of the second cutting element 620*b* (e.g., the arcuate beams 644 may be nested with or underneath second cutting arms 624*b* of the second cutting element 620*b*) and/or the piston element 640 (and/or the body portion 640-1 thereof) may be rotationally engaged and/or coupled to the shaft 610 such as by engaging with the threaded portion 612-1 thereof (e.g., via an interior threaded portion of the bore 640-2, which is not visible in FIG. 6). According to some embodiments, the latch feature 646 and/or the latch projection 646-1 thereof may engage and/or mate with the one of the plurality of indexing features 618-1 of the indexing portion 618 of the shaft 610.

In the case that the piston element 640 is coupled to the shaft 610 via threads, a clock-wise (right-turn) rotational engagement of the piston element 640 with respect to the shaft 610 may urge the piston element 640 further onto the shaft 610 in the direction toward the stop portion 616, increasing a compressive axial force exerted by the piston element 640 on each of the cutting elements 620*a-b* and the biasing elements 630, 642 (e.g., against the stop surface 616-1 of the shaft 610). In some embodiments, the increased compressive axial force may urge the arcuate beams 634, 644 further underneath their respectively-paired cutting arms 624*a-b*, which in turn causes an increase in the biasing forces exerted by the arcuate beams 634, 644 on the cutting arms 624*a-b*, thereby urging the cutting tools 626*a-b* further outward radially and/or increasing the resistive force imparted by the cutting tools 626*a-b* on an inside diameter of a tube or pipe (not shown). According to some embodiments, rotational tightening and/or loosening of the piston element 640 may be indexed at a variety of rotational positions. As depicted in FIG. 6, for example, six (6) different latching or indexing positions are provided (e.g., via six (6) different indexing detents comprising the indexing features 618-1) at sixty degree (60°) circumferential intervals about the shaft 610. Advancing the latch feature 646 from one indexing feature 618-1 position to the next, in accordance with some embodiments, requires an increased rotational force to urge the latch feature 646 axially away from the shaft 610. The latch feature 646 may, for example, comprise and/or include a biasing element that is biased toward the shaft 610 and/or is biased toward a default radial position, e.g., as shown, such as with the latch feature 646 fully engaged with or into one of the indexing feature 618-1 positions. In such a manner, for example, while the piston element 640 may be selectively indexed to a variety of positions with respect to the shaft 610 (each position corresponding to a particular biasing force setting or level), the biasing of the latch feature 646 may provide a rotational resistive force tending to maintain the latch feature 646 engagement with the indexing feature 618-1 during operational usage of the tube scraper projectile assembly 600.

In some embodiments, the tube scraper projectile assembly 600 may be selectively indexed to a particular desired biasing force by selective engagement of the latch feature 646 with a particular one of the indexing features 618-1 (and/or circumferential position thereof). The piston element 640 may be tightened onto the shaft 610, for example, until the latch feature 646 engages with the desired particular one of the indexing features 618-1. According to some embodiments, the tube scraper projectile assembly 600 may then be inserted into a tube, pipe, or other closed conduit (not shown) and propelled through the conduit via application of fluid (e.g., air, water) into the propellant void 640-4 and acting upon the fins 648. In such a manner, for example, deposits within the conduit may be scrapped, cut, dislodged, and/or otherwise removed from the interior of the conduit.

According to some embodiments, any or all of the components 610, 612, 612-1, 614, 614-1, 616, 616-1, 618, 618-1, 618-2, 620*a-b*, 620*a*-1, 620*b*-1, 622*a-b*, 622*a*-1, 622*b*-1, 624*a-b*, 626*a-b*, 630, 630-1, 632, 632-1, 634, 640, 640-1, 640-2, 640-4, 642, 644, 646, 646-1, 648 of the tube scraper projectile assembly 600 may be similar in configuration and/or functionality to any similarly named and/or numbered components described herein. Fewer or more components 610, 612, 612-1, 614, 614-1, 616, 616-1, 618, 618-1, 618-2, 620*a-b*, 620*a*-1, 620*b*-1, 622*a-b*, 622*a*-1, 622*b*-1, 624*a-b*, 626*a-b*, 630, 630-1, 632, 632-1, 634, 640, 640-1, 640-2, 640-4, 642, 644, 646, 646-1, 648 (and/or portions thereof) and/or various configurations of the components 610, 612, 612-1, 614, 614-1, 616, 616-1, 618, 618-1, 618-2, 620*a-b*, 620*a*-1, 620*b*-1, 622*a-b*, 622*a*-1, 622*b*-1, 624*a-b*, 626*a-b*, 630, 630-1, 632, 632-1, 634, 640, 640-1, 640-2, 640-4, 642, 644, 646, 646-1, 648 may be included in the tube scraper projectile assembly 600 without deviating from the scope of embodiments described herein. In some embodiments, one or more of the various components 610, 612, 612-1, 614, 614-1, 616, 616-1, 618, 618-1, 618-2, 620*a-b*, 620*a*-1, 620*b*-1, 622*a-b*, 622*a*-1, 622*b*-1, 624*a-b*, 626*a-b*, 630, 630-1, 632, 632-1, 634, 640, 640-1, 640-2, 640-4, 642, 644, 646, 646-1, 648 may not be needed and/or desired in the tube scraper projectile assembly 600.

III. Conclusion

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant(s) reserves the right to file additional applications to pursue patents for subject matter that has been disclosed and enabled, but not claimed in the present application.

What is claimed is:

1. A tube cleaning tool, comprising:
   a shaft comprising a first end and a second end, the shaft defining a longitudinal axis between the first and second ends, the shaft comprising:
   a shaped portion extending along the axis from the first end; and
   a threaded portion disposed adjacent to the second end;
   a first cylindrically-shaped cutting element comprising a first annular cutting element base coupled to the first end of the shaft and a first plurality of cutting arms extending longitudinally from an outer diameter of the first annular cutting element base, the first plurality of cutting arms defining a first interior void through which the shaped portion of the shaft extends;
   a second cylindrically-shaped cutting element comprising a second annular cutting element base coupled to the second end of the shaft and a second plurality of cutting arms extending longitudinally from an outer diameter of the second annular cutting element base, the second plurality of cutting arms defining a second interior void through which the shaped portion of the shaft extends;
   a first radial biasing element disposed on the shaft between the first cylindrically-shaped cutting element and the second cylindrically-shaped cutting element, the first radial biasing element comprising a first annular biasing element base and a plurality of arcuate beams extending longitudinally from the first annular biasing element base, the plurality of arcuate beams fitted into the first interior void; and
   a piston element disposed on the second end of the shaft, the piston element comprising (i) a body portion having a first end and a second end, (ii) a bore disposed through the body portion, (iii) an interior threaded portion within the bore that engages with the threaded portion of the shaft and (iv) a second radial biasing element comprising a plurality of arcuate beams extending longitudinally from the first end of the body portion, the plurality of arcuate beams fitted into the second interior void.

2. The tube cleaning tool of claim 1, wherein the first annular cutting element base of the first cylindrically-shaped cutting element defines a shaped orifice that accepts the shaped portion of the shaft to permit the shaft to impart rotation to the first cylindrically-shaped cutting element.

3. The tube cleaning tool of claim 2, wherein the shaped orifice comprises a hexagonal orifice.

4. The tube cleaning tool of claim 1, wherein the second annular cutting element base of the second cylindrically-shaped cutting element defines a shaped orifice that accepts the shaped portion of the shaft to permit the shaft to impart rotation to the second cylindrically-shaped cutting element.

5. The tube cleaning tool of claim 4, wherein the shaped orifice comprises a hexagonal orifice.

6. The tube cleaning tool of claim 1, wherein the first annular biasing element base of the first radial biasing element defines a shaped orifice that accepts the shaped portion of the shaft to permit the shaft to impart rotation to the first radial biasing element.

7. The tube cleaning tool of claim 6, wherein the shaped orifice comprises a hexagonal orifice.

8. The tube cleaning tool of claim 1, wherein the second annular cutting element base of the second cylindrically-shaped cutting element is coupled to the first annular biasing element base of the first radial biasing element.

9. The tube cleaning tool of claim 1, wherein the piston element further comprises (v) a plurality of fins extending longitudinally from an outer diameter of the body portion proximate to the second end of the body portion.

10. The tube cleaning tool of claim 9, wherein the plurality of fins are angled toward the second end of the body portion, thereby defining a frusto conical void at the second end, the frusto conical void operable to accept pressurized fluid flow and thereby relay a pushing force from the pressurized fluid flow to the tube cleaning tool.

11. The tube cleaning tool of claim 1, wherein the shaft further comprises an indexing portion at the second end of the shaft, the indexing portion comprising a plurality of detent catch features arranged around a circumference of the shaft at the second end of the shaft.

12. The tube cleaning tool of claim 11, wherein the piston element further comprises (v) a detent latch feature disposed at the second end of the piston element and operable to selectively mate with one of the plurality of detent catch features at the second end of the shaft.

13. The tube cleaning tool of claim 12, wherein the plurality of detent catch features comprise cuneate impressions in the shaft circumference and wherein the detent latch feature comprises a cuneal projection operable to be received by any of the cuneate impressions.

14. The tube cleaning tool of claim 11, wherein the plurality of detent catch features comprise six detent catch features evenly-spaced around the circumference of the shaft.

15. A tube cleaning tool, comprising:
a shaft comprising a first end and a second end, the shaft defining a longitudinal axis between the first and second ends, the shaft comprising:
a shaped portion extending along the axis from the first end;
a threaded portion disposed adjacent to the second end; and
an indexing portion at the second end of the shaft, the indexing portion comprising a plurality of detent catch features arranged around a circumference of the shaft at the second end of the shaft;
a first cylindrically-shaped cutting element comprising a first annular cutting element base coupled to the first end of the shaft and a first plurality of cutting arms extending longitudinally from an outer diameter of the first annular cutting element base, the first plurality of cutting arms defining a first interior void through which the shaped portion of the shaft extends;
a second cylindrically-shaped cutting element comprising a second annular cutting element base coupled to the second end of the shaft and a second plurality of cutting arms extending longitudinally from an outer diameter of the second annular cutting element base, the second plurality of cutting arms defining a second interior void through which the shaped portion of the shaft extends;
a first radial biasing element fitted into the first interior void and disposed on the shaft between the first cylindrically-shaped cutting element and the second cylindrically-shaped cutting element; and
a piston element disposed on the second end of the shaft, the piston element comprising (i) a body portion having a first end and a second end, (ii) a bore disposed through the body portion, (iii) an interior threaded portion within the bore that engages with the threaded portion of the shaft, (iv) a second radial biasing element fitted into the second interior void, and (v) a detent latch feature disposed at the second end of the piston element and operable to selectively mate with one of the plurality of detent catch features at the second end of the shaft.

16. The tube cleaning tool of claim 15, wherein the plurality of detent catch features comprise cuneate impressions in the shaft circumference and wherein the detent latch feature comprises a cuneal projection operable to be received by any of the cuneate impressions.

17. The tube cleaning tool of claim 15, wherein the plurality of detent catch features comprise six detent catch features evenly-spaced around the circumference of the shaft.

18. The tube cleaning tool of claim 15, wherein the first radial biasing element comprises a first annular biasing element base and a plurality of arcuate beams extending longitudinally from the first annular biasing element base, the plurality of arcuate beams fitted into the first interior void.

19. The tube cleaning tool of claim 15, wherein the second radial biasing element comprises a plurality of arcuate beams extending longitudinally from the first end of the body portion of the piston element, the plurality of arcuate beams fitted into the second interior void.

20. The tube cleaning tool of claim 15, wherein the piston element further comprises (vi) a plurality of fins extending longitudinally from an outer diameter of the body portion proximate to the second end of the body portion, the plurality of fins being angled toward the second end of the body portion, thereby defining a frusto conical void at the second end, the frusto conical void operable to accept pressurized fluid flow and thereby relay a pushing force from the pressurized fluid flow to the tube cleaning tool.

21. A tube cleaning tool, comprising:
a shaft comprising a first end and a second end, the shaft defining a longitudinal axis between the first and second ends, the shaft comprising:
a shaped portion extending along the axis from the first end; and
a threaded portion disposed adjacent to the second end;
a first cylindrically-shaped cutting element comprising a first annular cutting element base coupled to the first end of the shaft and a first plurality of cutting arms extending longitudinally from an outer diameter of the first annular cutting element base, the first plurality of cutting arms defining a first interior void through which the shaped portion of the shaft extends;

a second cylindrically-shaped cutting element comprising a second annular cutting element base coupled to the second end of the shaft and a second plurality of cutting arms extending longitudinally from an outer diameter of the second annular cutting element base, the second plurality of cutting arms defining a second interior void through which the shaped portion of the shaft extends;

a first radial resistance element disposed on the shaft between the first cylindrically-shaped cutting element and the second cylindrically-shaped cutting element, the first radial resistance element comprising a first radial resistance element base and a plurality of tapered beams extending longitudinally from the first radial resistance element base, the plurality of tapered beams fitted into the first interior void; and a piston element disposed on the second end of the shaft, the piston element comprising (i) a body portion having a first end and a second end, (ii) a bore disposed through the body portion, (iii) an interior threaded portion within the bore that engages with the threaded portion of the shaft and (iv) a second radial resistance element comprising a plurality of tapered beams extending longitudinally from the first end of the body portion, the plurality of tapered beams fitted into the second interior void.

* * * * *